United States Patent

Scott

[15] 3,667,630

[45] June 6, 1970

[54] AUTOMOBILE TOWING ASSEMBLY

[72] Inventor: Albert Rockwood Scott, 287 Wychwood Ave, Toronto, Ontairo, Canada

[22] Filed: July 20, 1970

[21] Appl. No.: 64,016

Related U.S. Application Data

[63] Continuation of Ser. No. 808,414, Mar. 19, 1969, abandoned.

[30] Foreign Application Priority Data

Mar. 21, 1968 Great Britain......................13,638/68

[52] U.S. Cl. ...........................................214/86 A, 280/402
[51] Int. Cl. ..........................................................B60p 3/12
[58] Field of Search ...............................214/86 A; 280/402

[56] References Cited

UNITED STATES PATENTS

| | | | |
|---|---|---|---|
| 1,630,800 | 5/1927 | Page | 214/86 A |
| 2,793,770 | 5/1957 | St. Denis | 214/86 A |
| 3,182,828 | 5/1965 | Ormsby | 214/86 A |
| 3,512,664 | 5/1970 | Tolle | 214/86 A |

Primary Examiner—Albert J. Makay
Attorney—Cecil C. Kent

[57] ABSTRACT

A standard automobile or truck is convertible to a towing vehicle by the easy installation (and removal) of a frame to which is connected a derrick, source of power, rotatable drawbar system, sling unit and rotatably liftable load bearing towing wheel arrangement which is lockable in lowered operating position and elevated by the rotation into the vertical out-of-use position of said draw system.

16 Claims, 7 Drawing Figures

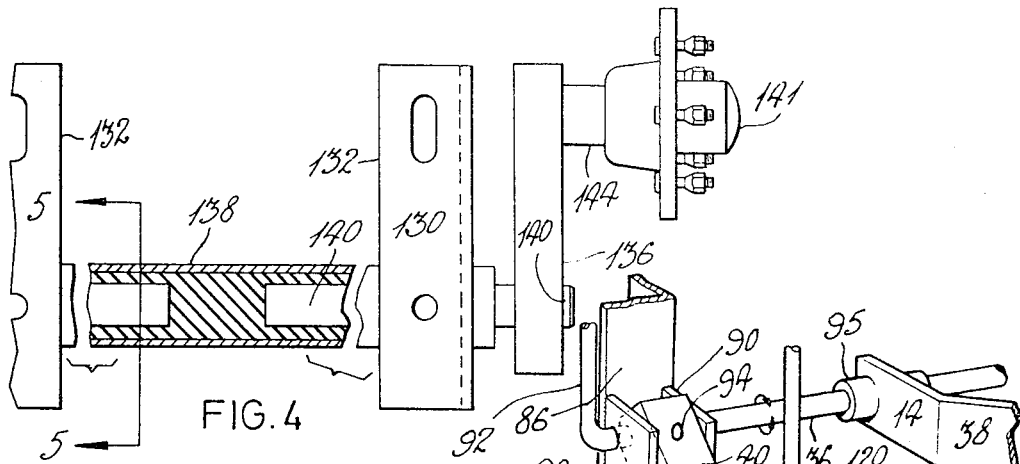
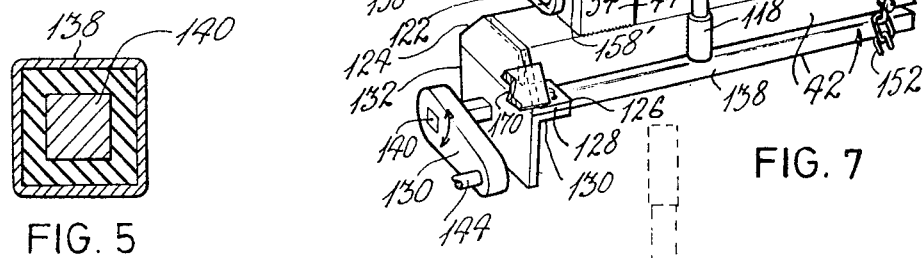
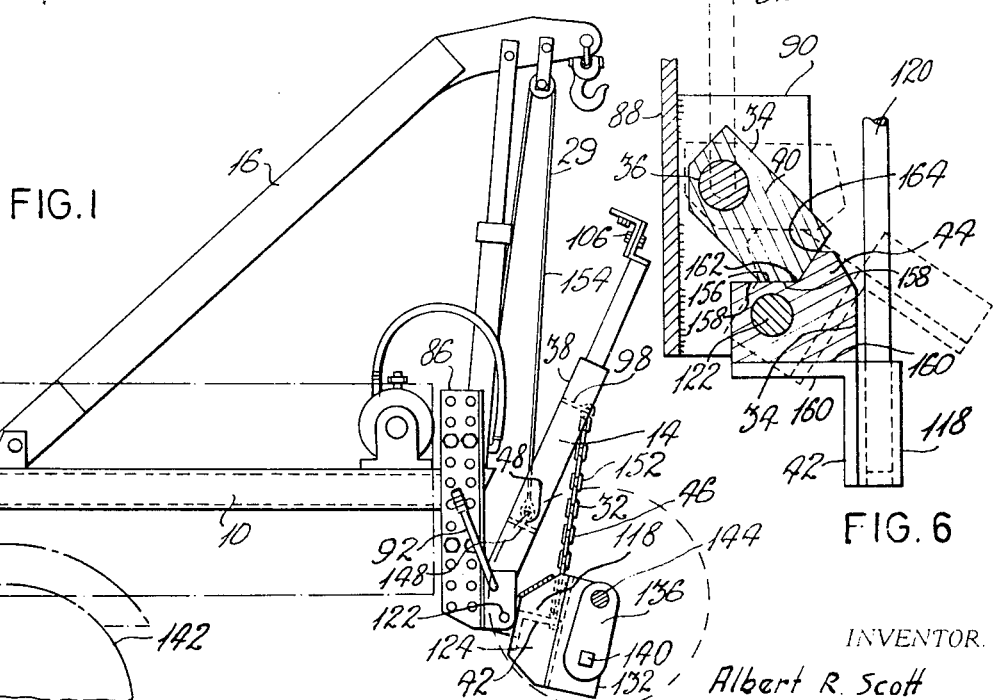

INVENTOR.
Albert R. Scott

AUTOMOBILE TOWING ASSEMBLY

This application is a continuation of application Ser. No. 808,414, filed Mar. 19, 1969, now abandoned.

The present invention relates to automobile towing assemblies, a first novel feature being to provide an assembly of the character disclosed which is adapted and designed for ready installation in, and removal from the trunk of a conventional automobile or a truck body and so as to project somewhat from the rear end thereof, the assembly including a source of power and being easily so installable and removable and in addition well designed for the purpose of unditching, hauling and the like disabled vehicles while saleable to service stations and the like for a price well within the reach of all such places.

Another novel feature of the invention is to provide a towing assembly including a towing wheel arrangement which may be elevated when out of use and locked down when in use independently of the stabilizing system.

Still another object of the invention is to provide means whereby the means for pivotally connecting the stabilizing system to the frame is vertically adjustable relative to the remainder of the frame according to the height of the body or trunk normally above ground level for example.

With the foregoing in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying figures in which:

FIG. 1 is a side elevation of the present invention.

FIG. 4 is a detail for which no novelty is claimed per se of the towing wheel arrangement.

FIG. 5 is a section on the line 5—5 of FIG. 4.

FIG. 6 is a section on the line 6—6 of FIG. 3.

FIG. 7 is a perspective representation of the invented means for locking the aforesaid towing wheel arrangement in disabled vehicle load bearing ground contacting attitude.

In the drawings, like characters of reference designate similar parts in the several figures.

Figure 3:
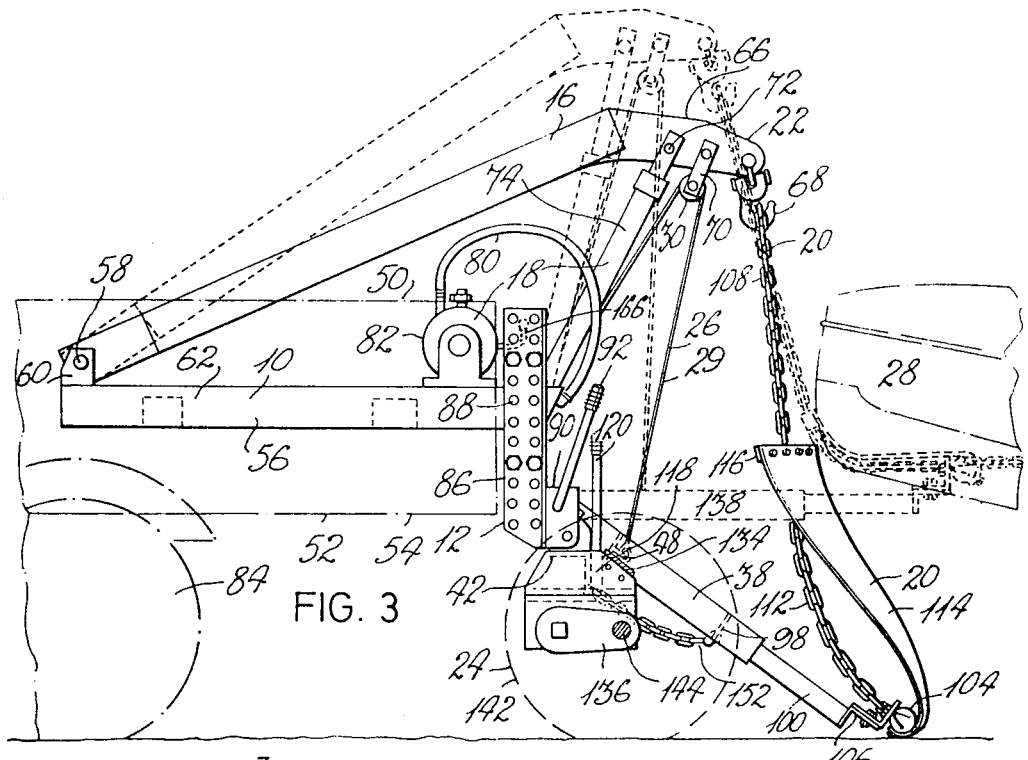
FIG. 3 is a section on the line 3—3 of FIG. 2.

By way of initial summary the present invention comprises an automobile or the like towing assembly adapted and designed for ready installation as aforesaid, being characterized by comprising in combination a frame generally designated 10 including means 12 for pivotally connecting a stabilizing system 14 to said frame, a derrick collectively designated 16 pivotally connected to said frame and projecting beyond the rear end thereof and operatively connected to the source of power generally designated 18. The assembly also includes a sling unit collectively designated 20 extending between the distal end 22 of the said derrick and stabilizing system. A towing wheel arrangement collectively designated 24 is operatively associated with frame 10 and does not, as already indicated in and of itself form part of the present invention save and excepting insofar as the same is inventively associated with other parts thereof. Means 26 extend between the derrick and the stabilizing system for rotating the stabilizing system vertically upon vertical rotation of the derrick, independently of the aforesaid sling unit for the purpose of adjusting the inclination of the stabilizing unit with respect to a disabled vehicle 28 before hooking up said sling unit thereto.

Continuing this initial summary, the aforesaid means 26 includes more specifically a cable 29 anchored at one end to or in the vicinity of frame 10 and at the other to the said stabilizing system, together with pulley means 30 at the distal end of the derrick, over which the cable passes. Means 32 actuable upon vertical rotation of the derrick are also provided for raising and lowering the towing wheel assembly, together with further means collectively designated 34 for locking towing wheel arrangement 24 in disabled vehicle load bearing ground contacting attitude.

To conclude this summary, the aforesaid stabilizing system includes a transverse hitch support bar collectively designated 36 (which may also be regarded as a part of locking means 34) rotatable about its longitudinal axis and spanning frame 10, and also a sling hitch 38 freely rotatable upon bar 36, parts 36 and 38 forming part of the stabilizing system 14. Somewhat more specifically, locking means 34 also includes a dog 40 secured for rotation together with bar 36, the wheel arrangement 24 including an elongated transverse member 42 (for which novelty is expressly claimed) rotatable about its longitudinal axis, a lug 44 projecting therefrom. Means 46 (which are practically one and the same or a part of means 32) are provided for rotating the member 42 (and it is to be understood that novelty is expressly claimed for this feature notwithstanding its close association with towing wheel arrangement 24 per se), the aforesaid dog and lug being located for interlocking engagement and separation upon bar 36 and member 42 respectively with the wheels of the arrangement 24 being operatively connected to member 42 in linked offset resilient relationship. From the foregoing it is to be understood that one end of cable 29 is anchored to hitch 38 and means 48 (FIGS. 1 and 2) are included for rotating member 42 upon the vertical rotation of the hitch 38.

Having thus summarized the present invention in terms consonant with the accompanying claims, a more detailed description follows.

Frame 10 may be secured to the walls 50 or to the floor 52 if desired of the towing vehicle 54 and such frame is in general a simple rectangular structure of beams 56 of any suitable configuration but preferably box-form. Derrick 16 is pivotted at 58 to the upstanding lugs 60 upon either of the lateral or longitudinally extending members 62 of frame 10 and from FIG. 2 it will best be seen that the derrick is comprised essentially of a pair of upwardly and rearwardly converging beams preferably also of box-section downwardly angulated as well depicted in the accompanying FIG. 3 in which the distal end 22 is seen to comprise a piece of heavy flat stock 66 to either side of which the rear ends of members 64 may be welded. At the extreme end of 66 a hook assembly 68 is provided. Slightly to the rear of this is located a clevis 70 or the equivalent within which the pulley 30 is journalled. Rearwardly (or more correctly toward the front of the towing vehicle) and adjacent clevis or the like 70 is located pivotally as at 72, the upper end of a hydraulic ram assembly collectively designated 74 the lower end of which is suitably pivotally connected as at 76 (FIG. 2) to the lateral beam 78 of frame 10 for limited vertical rotation. The hydraulic ram 74 of course forms part of the aforesaid source of power 18 and includes the supply line 80 and motor and pump assembly 82 also supported on frame 10 in a manner which need not be detailed.

It will be observed that preferably derrick 16 is pivotted (at 58) substantially over the axis of the rear towing vehicle wheel 84. Forming part of frame 10, as already indicated, are the means 12 for pivotally connecting stabilizing system 14 to the frame. Means 12 in greater detail comprise a pair of vertical angle members 86 provided with a multiplicity of drillings 88 therein for the reception of the pair of brackets 89 whereby the horizontal altitude of frame 10 may be determined at the rear end thereof.

At the lower ends of the members 86 rearwardly projecting pairs of vertically disposed plates 90 are provided and between each pair of such plates (in alignment with the rear faces of the members 86) are located the locking means collectively designated 34. The dog 40 and lug 44 are of the configuration clearly depicted in the accompanying FIGS. 6 and 7, lug 44 being transfixed by bar 36 which is angulated where best depicted in the accompanying FIG. 7 upwardly to form a lever 92. A tapered pin 94 or the like extending through dog 40 and bar 36 is the method of choice for securing these two parts together for rotation as a unit.

Stabilizing system 14, and more specifically, the hitch 38 constituting an essential part thereof is freely journalled on bar 36, being held against lateral movement as by means of the keyed collars 95. The hitch is formed of a pair of rearwardly converging bars 96, strengthened by the cross-bar 98 and terminating in the tongue 100 to the distal end of which extends transversely the conventional hitch bar 102 provided with hooks 104 at the ends thereof, and the intermediate angle bracket assembly collectively designated 106 in the accompanying FIG. 3 which, being conventional need not be detailed.

Figure 2:
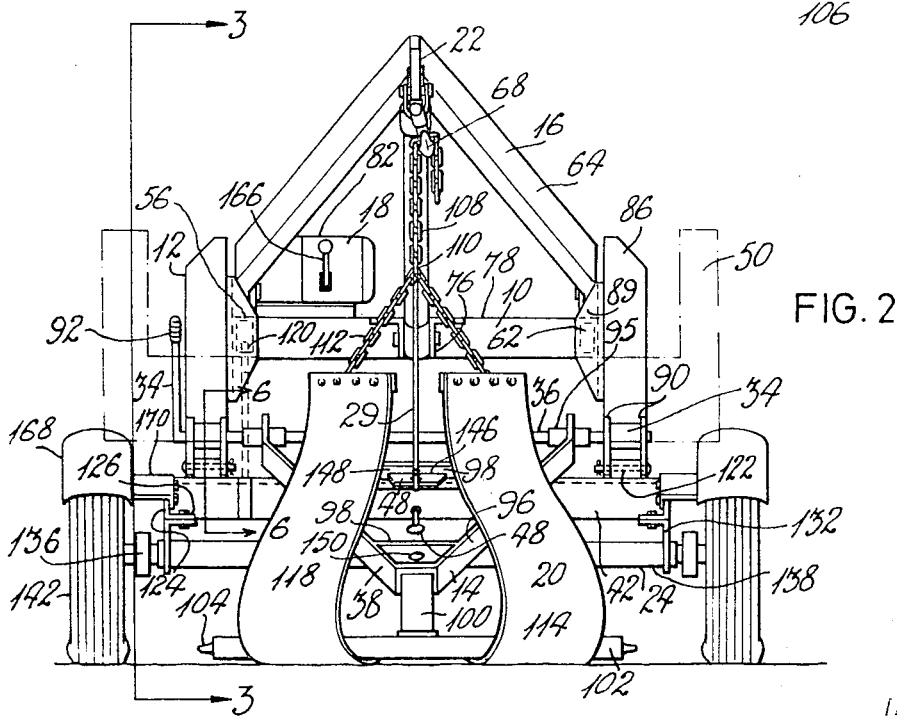
FIG. 2 is an elevation of the invention as viewed from the rear end of a vehicle to which the same is attached.

Extending downwardly from hook 68 is a chain 108, the same being at 110 of the accompanying FIG. 2 seen to be linked to a pair of diverging chains 112. These may be connected to the upper end of the pair of slings 114. However, alternatively, the chain portions 112 may extend downwardly behind the slings 114 as well depicted in the accompanying FIG. 3, and sleeves (not shown) may be centrally secured to the stiffening upper end cross pieces 116 through which such chains may pass so that the slings 114 may ride up and down the chains, it being understood that the slings (of rubber or like substance) are merely to prevent injury to the bumpers of the disabled vehicle 28 while the chains perform the actual lifting therebeneath all as sufficiently clearly depicted in phantom lines in the said accompanying FIG. 3.

Elongated transverse member 42 is in the form of an angle beam, and lugs 44 are suitably secured thereto as by welding. Slightly inboard of the left hand lug 44 (with respect to the accompanying FIG. 2) is a socket 118 into which may be placed and from which may be removed the bar 120 for the purpose presently to be described. Extending through each of the lugs 44 and through apertures provided therefor in the plates 90 are dowel pins 122. Accordingly and from all the foregoing it will be apparent that member 42 is journalled upon these dowel pins. Also by best reference to the accompanying FIG. 7 it will be observed that the ends of the member 42 are closed by the upstanding flanges 124 of the angle brackets 126 the horizontal flanges 128 of which are welded to the complementary flanges 130 of the brackets 132 or else bolted thereto as in the accompanying FIG. 2. Spanning the flanges 124 is a piece of flat stock 134.

Outboard of the angle brackets 132 are links 136 journalled to brackets 132 by means of the transverse square tube 138. This tube is filled with hard rubber and into the opposite ends thereof square stub shafts 140 are inserted which project through squared apertures in the links 136. Offset from these squared apertures are the conventional hubs 141 for the wheel pair 142. Rotatable about the locus 144 which in the accompanying FIG. 7 is conventionally shown as a short outwardly projecting stub shaft and from the foregoing it will be understood, particularly aided by the showings of the accompanying FIGS. 3, 4 and 5 that when the wheels 142 are in full ground contact and under load, a resilient yielding suspension system is provided to absorb and soften shock. It is however again repeated that the substance of this particular context, that is to say, the substance of FIGS. 4 and 5 is not novel but is obtainable from sources of supply.

Means 48 by which cable 29 is anchored at its lower end is a fish plate 146 projecting from a forward reinforcing bar 148 of hitch 38 while the opposite end of cable 29 is anchored at any convenient point preferably upon frame 10. Anchored to the cross bar 98 on the aforesaid hitch via such as aperture 150 is a piece of chain 152 (hitherto referred to as means 32), the lower end of this chain being anchored to the outwardly projecting lug means 48 upon member 42.

OPERATION

In the accompanying FIG. 1 the invention is shown with the towing wheel arrangement 24 elevated and likewise the stabilizing system 14. The latter is so held by raising derrick arm 16. This shortens the fall portion 154 of cable 29. The raising of the stabilizing arm in turn, via chain 152 rotates bar 42 about the trunnions or pins 122. Although, in FIG. 1 the stabilizing system or more particularly the hitch is shown sub-vertical, in actual practice it will be very nearly vertical if not perfectly vertical and with the double angle portion 106 thereof actually touching and perhaps actually causing a slight leftward angulation to the fall 154. Preferably, the wheels 142 will be 6 to 8 inches clear of the ground at this time.

To lower the towing wheel arrangement, obviously the derrick arm is simply lowered and the wheel arrangement and stabilizing system is depicted as fully lowered in the accompanying FIG. 3.

However, after being fully lowered, in order to raise the distal end of the stabilizing assembly or hitch 38 clear of the ground so that the towing vehicle may be more conveniently backed up close to the disabled vehicle, the following procedure is resorted to:

With the wheel arrangement 24 touching the ground and the stabilizing system 14 slightly raised clear of the ground as aforesaid it is necessary next (a) to lower the wheel arrangement 24 further slightly so to speak and apply some slight pressure of the wheels 142 against the ground as in FIG. 3 in order to take the disabled vehicle load without too much further subsidence. It is to be understood that while the stabilizing system is elevated as for example in FIG. 1 the wheel arrangement 24 is in unlocked condition, with the dog and lug 40 and 44 substantially in the positions which are shown in phantom lines in the accompanying FIG. 6, it being understood that in fact there will be a slight tolerance between the obtusely angulated surfaces shown as being in contact between said dog and lug in the just mentioned figure and which surfaces for convenience are hereby designated 156, 156', and 158, 158' (in the accompanying FIG. 7).

With the member 142 rotated substantially into the position of the accompanying FIGS. 6 and 7 so that the upper flange 160 thereof is more or less horizontal, rod 120 is inserted into socket 118 and rotated clockwise with respect to the accompanying FIG. 6, and likewise lever 92. This causes the aforesaid mating surfaces 156 and 158 to click into the firmly locked position depicted in FIG. 6 and it will be recognized that in rotating dog 40 clockwise, the edge 162 thereof may, in its passage clockwise apply a slight clockwise force upon the edge 164 of lug 44 although this will be slight or perhaps nonexistent according to the amount of pressure exerted upon rod 120.

In any event, by this means, the wheel arrangement is firmly pressed against the ground and securely locked. Accordingly the hitch 38 may now be raised without rotating member 42 counterclockwise since such will only commence to occur after the hitch is elevated above the horizontal shown in FIG. 3 when chain 152 becomes taut and commences, via projecting lug 48 to apply counterclockwise rotation upon the member 42.

When the vehicles have reached their destination, unlocking is effected by applying a slight clockwise effort upon lever or bar 120 and a counterclockwise effort upon lever 92 so that the edge 162 of dog 40 can ride past edge 164 of lug 44 and again assume the phantom line position of FIG. 6 or substantially so and in this connection of course it will be apparent that the actual disposition as between verticality, sub-verticality or the like of lever 92 will be dictated by manual convenience wherefore the relative positions of same shown in the various figures are not to be considered as necessarily determining.

The derrick 16 is of course raised and lowered to the degrees necessary during the aforesaid activities by the lever 166, and the concluding action is of course to elevate the derrick so as to bring the stabilizing system 14 and particularly the hitch 38 thereof into fully vertical or sub-vertical position as has previously been stated. Finally it is explained that wheel fenders 168 are secured by the angle brackets 170 (FIG. 7) to the interior ends of plates 124 and therefore rotate with member 42 to assume different positions as between the raised position of FIG. 1 and the lowered positions of FIGS. 2 and 3.

Various modifications may be constructed or performed within the scope of the inventive concept disclosed. Therefore what has been set forth is intended to illustrate such concept and is not or the purpose of limiting protection to any herein particularly described embodiment thereof.

What is claimed is:

1. An automobile or the like towing assembly for use with a sling unit, adapted and designed for ready installation in, and removal from the trunk of a conventional automobile or from a truck body so as to project from the rear end thereof including a source of power, said assembly being characterized by comprising in combination (i) a frame attached to the floor or sides of said conventional automobile or truck, (ii) a derrick pivotally connected to said frame projecting beyond the rear end thereof and being operatively connected to said source of power, (iii) a stabilizing system pivotally operatively associated with said frame, said frame including means for pivotally connecting said stabilizing system to said frame, (iv) a towing wheel arrangement operatively associated with said frame, and (v) means extending between said derrick and said stabilizing system for rotating said stabilizing system vertically upon vertical rotation of said derrick independently of said sling unit for the purpose of adjusting the inclination of said stabilizing system with respect to a disabled vehicle before hooking up said sling unit thereto, said sling unit extending between the distal end of said derrick and said stabilizing system.

2. The invention according to claim 1 which includes a cable anchored at one end to or in the vicinity of said frame and at the other to said stabilizing system, and pulley means at the distal end of said derrick over which said cable passes.

3. The invention according to claim 1 which includes means actuable upon vertical rotation of said derrick for raising and lowering said towing wheel arrangement and for locking said towing wheel arrangement in disabled vehicle load bearing ground contacting attitude.

4. The invention according to claim 3 which includes a cable anchored at one end to or in the vicinity of said frame and at the other to said stabilizing system, and pulley means at the distal end of said derrick over which said cable passes.

5. The invention according to claim 1 which includes a cable anchored at one end thereof to or in the vicinity of said frame and at the other to said stabilizing system, pulley means at the distal end of said derrick over which said cable passes, and means actuable upon vertical rotation of said derrick for raising and lowering said towing wheel arrangement and for locking said towing wheel arrangement in disabled vehicle load bearing ground contacting attitude.

6. The invention according to claim 5 in which said towing wheel arrangement includes a pair of ground wheels spaced substantially apart.

7. The invention according to claim 6 in which said sling unit is anchored at the upper end thereof to the distal end of said derrick.

8. The invention according to claim 7 in which said means for pivotally connecting said stabilizing system to said frame is vertically adjustable relative to the remainder of said frame, said source of power being mounted on said frame.

9. The invention according to claim 7 in which said stabilizing system includes (i) a transverse hitch support bar rotatable about its longitudinal axis and spanning said frame, (ii) a sling hitch freely rotatable upon said bar, and (iii) means for rotating said bar, said locking means including a dog secured for rotation with said bar, said wheel arrangement including an elongated transverse member rotatable about its longitudinal axis, a lug projecting therefrom, means for rotating said member, said dog and lug being located for interlocking engagement and separation upon said bar and member respectively, said wheels being operatively connected to said member in linked offset resilient relationship.

10. The invention according to claim 9 in which one end of said cable is anchored to said hitch, and which includes means for rotating said elongated transverse member upon the vertical rotation of said hitch.

11. The invention according to claim 1 in which said stabilizing system includes (i) a transverse hitch support bar rotatable about its longitudinal axis and spanning said frame, and (ii) means for rotating said bar, said locking means including a dog secured for rotation with said bar, said wheel arrangement including an elongated transverse member rotatable about its longitudinal axis, a lug projecting therefrom, means for rotating said member, said dog and lug being located for interlocking engagement and separation upon said bar and member respectively, said wheels being operatively connected to said member in linked offset resilient relationship, said sling hitch being freely rotatable upon said bar.

12. The invention according to claim 2 which includes means actuable upon vertical rotation of said derrick for raising and lowering said towing wheel arrangement and for locking said towing wheel arrangement in disabled vehicle load bearing ground contacting attitude.

13. The invention according to claim 12 which includes flexible elongated longitudinal-effort-applying means attached at one end thereof to or in the vicinity of said frame and at the other to said stabilizing system, rotary means at the distal end of said derrick to which said flexible effort means are operatively connected and means actuable upon vertical rotation of said derrick for raising and lowering said towing wheel arrangement and for locking said towing wheel arrangement in disabled vehicle load bearing ground contacting attitude.

14. The invention according to claim 13 in which said towing wheel arrangement includes a pair of ground wheels spaced substantially apart.

15. The invention according to claim 8 in which said stabilizing system includes (i) a transverse hitch support bar rotatable about its longitudinal axis and spanning said frame, and (ii) means for rotating said bar, said locking means including a dog secured for rotation with said bar, said wheel arrangement including an elongated transverse member rotatable about its longitudinal axis, a lug projecting therefrom, means for rotating said member, said dog and lug being located for interlocking engagement and separation upon said bar and member respectively, said wheels being operatively connected to said member in linked offset resilient relationship, said sling hitch being freely rotatable upon said bar, said towing wheel arrangement including a pair of ground wheels spaced substantially apart.

16. The invention according to claim 1 which includes flexible elongated longitudinal-effort-applying means attached at one end thereof to or in the vicinity of said frame and at the other to said stabilizing system, rotary means at the distal end of said derrick to which said flexible effort means are operatively connected and means actuable upon vertical rotation of said derrick for raising and lowering said towing wheel arrangement and for locking said towing wheel arrangement in disabled vehicle load bearing ground contacting attitude.

* * * * *